Patented Aug. 9, 1932

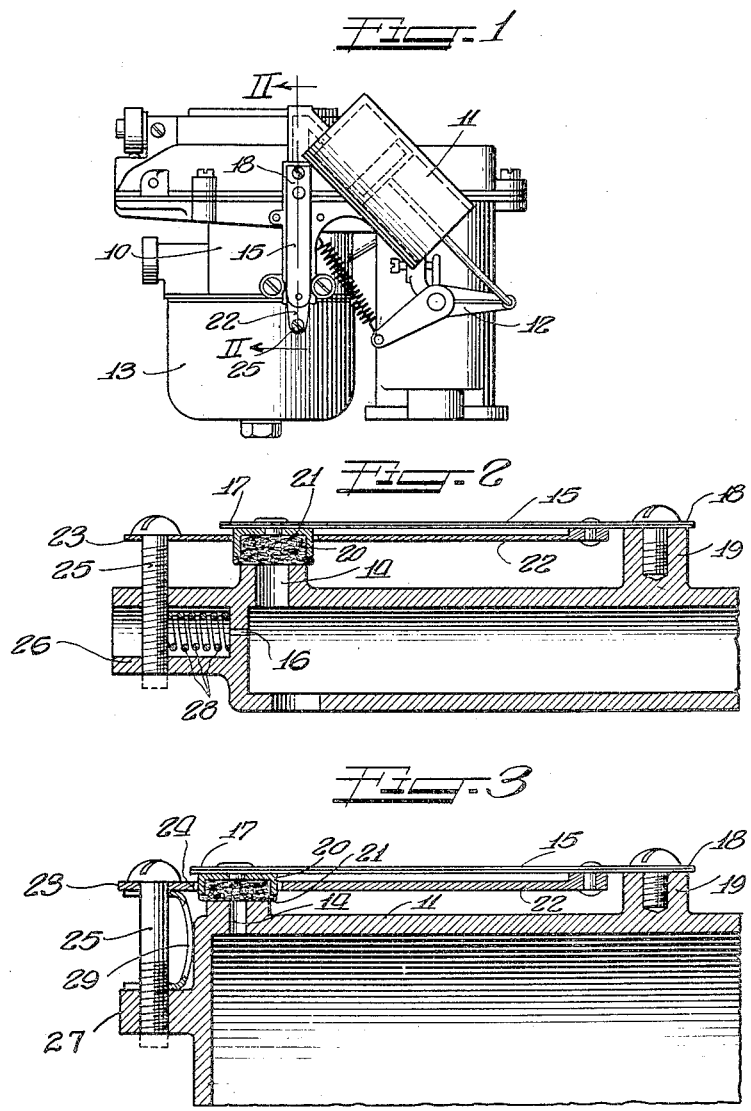

1,870,253

UNITED STATES PATENT OFFICE

CHESTER F. JOHNSON, DECEASED, LATE OF DETROIT, MICHIGAN, BY DETROIT AND SECURITY TRUST CO., EXECUTOR, OF DETROIT, MICHIGAN

THERMOSTATIC CONTROL

Application filed September 10, 1930. Serial No. 481,025.

This invention relates to an improved thermostatic member and, particularly, a thermostatically controlled vent for carbureters for internal combustion engines.

In applying a thermostatic control to carbureters, for example, wherein the thermostat varies the fuel feed either directly, or indirectly by controlling an air bleed or vent, in accordance with operating temperatures, it has heretofore been found to be a difficult and uncertain operation to preset the thermostat to open at a predetermined temperature, because of the exaggerated effect of adjustments made at the anchorage of the fixed end of the thermostatic member. It is often desirable to change the adjustment after the carbureter has been installed on the car, either because of the use of a different grade of gasoline or to modify an adjustment already made which does not quite meet the particular requirements. It is, accordingly, an object of this invention to provide an improved and simplified adjustment for thermostatic elements wherein the adjustment can be preset for predetermined temperatures while working at normal temperatures, and that can readily be altered afterwards should occasion require.

It is a further object of this invention to provide an improved adjustable thermostatic member wherein the adjustment is effective at the free end of the thermostatic member and, hence, permits a wide range of movement for a small degree of effective thermostat adjustment.

Other and further important objects of this invention will be apparent from the disclosures in the specification and the accompanying drawing.

This invention (in a preferred form) is illustrated in the drawing and hereinafter more fully described.

On the drawing:

Figure 1 is an elevation of a carbureter incorporating a thermostatic control embodying the features of this invention.

Figure 2 is an enlarged fragmentary section on the line II—II of Fig. 1.

Figure 3 discloses a modified form of adjustment lock for the thermostat together with a modification in the location thereof.

As shown on the drawing:

The application of the adjustable thermostat of this invention is illustrated in Fig. 1 as controlling an air bleed or vent into a carbureter 10 where an air pump 11 operated by the opening movement of the throttle lever 12 serves to momentarily increase the air pressure above the fuel in the float bowl 13 to supply a supplemental or accelerating charge of fuel, which supply is sustained for a brief interval after the opening movement of the throttle until manifold conditions become stabilized at the new rate of flow.

In Figures 1 and 2, a vent 14 is so positioned relative to the illustrated downdraft carbureter that it will also serve as a drain in case of flooding of the float chamber. In Fig. 3, this feature is lacking as the vent opens directly into the air pump cylinder 11. In either location the vent serves as an air bleed to decrease the effectiveness of the air pump and to reduce the period of excess fuel delivery, so that when thermostatically controlled, the vent serves to give a richer and more prolonged accelerating fuel supply under cold conditions than under warm conditions wherein a thermostat 15 acts to uncover the vent. A secondary small fixed vent 16 is shown in Fig. 2 which serves to prevent the float bowl from becoming air-bound.

The thermostat 15 is a bimetal strip wherein metals having dissimilar coefficients of expansion are united to form a strip or bar so positioned that it will bow or bend upwardly at its free end 17 in both forms of the invention. The fixed end 18 of the thermostatic strip is attached to a suitable anchorage 19, while the free end 17 carries a cup-like member 20 containing a felt pad 21 which is held in sealing relationship with the vent 14 below a predetermined temperature.

With the structure so far described, it has been found difficult to adjust the thermostatic strip to begin to open the vent at a predetermined temperature because such an adjustment would necessarily have to be made at the seating surface of the anchorage 19 where a slight change would be greatly multiplied in effect at the free end of the thermostatic strip. Moreover, the adjusting would have to be made with all parts held accurately and uniformly at the desired opening temperature, which varies with different engine installations.

In order to permit accurate and simple adjustment of this thermostatic member to begin to open at a predetermined temperature, he attaches a relatively rigid bar 22 at one end to the thermostatic strip 15 adjacent its fixed or anchored end 18. The other end 23 of the bar extends beyond the free end 17 of the thermostatic strip and is apertured at 24 for the felt pad and cup. A screw 25 passing through a suitable aperture in the free end 23 of the bar, threadingly engages in a suitable boss 26 in Fig. 2 and 27 in Fig. 3. This boss 26 in Fig. 2 is formed to receive a compression spring 28 back of the screw 25 to prevent the latter from turning freely, and a similar result is obtained in Fig. 3 by a spring strip 29 so bent as to engage both the screw and the adjacent surface of the pump cylinder 11.

In the adjustment of the thermostatic element, it is initially so mounted on its anchorage that it clears the vent 14 somewhat at normal temperatures prior to the insertion of the screw 25. Then the screw 25 is inserted and screwed down to a point where the felt pad is just closing against its seat and is then given a predetermined number of turns or fractional turns further in, to compensate for the difference between room temperature and the desired vent opening temperature as determined by preliminary engine operating tests when first adjusting the carbureter to a given engine design. The projecting end of the screw, indicated by dotted lines in Figs. 2 and 3, is then cut off flush with the lower surface of the boss, to serve as an indication of the original setting should further adjustments be made later on. For example, it has been found desirable to have the vent open at 95° for one engine design and at 105° for another of different make.

It will thus be seen that he has invented an improved thermostatic control wherein adjustment of the thermostat is facilitated by the provision of adjustment means having a wide range of movement for a small degree of effective thermostatic movement.

He claims as his invention:

1. A thermostatically controlled vent for carbureters including a bimetallic thermostatic strip anchored at one end and provided with vent closing means at its free end, and adjusting means therefor comprising a bar attached to the thermostatic strip adjacent the anchorage thereof, and extending in line with the normal axis thereof and means engaging the free end of said bar to vary the initial flexure of the thermostatic strip relative to its anchorage whereby to closely adjust the opening movement of the thermostatic strip to commence at a predetermined temperature.

2. In a carbureter, an air vent, a closure for said vent, an anchored thermostatic strip controlling said closure, a relatively rigid bar, attached to said thermostatic strip near its anchored end and extending substantially parallel with the normal axis thereof to a point beyond said air vent, and a screw threadingly engaged in a suitable boss to hold said extended rigid bar in position whereby said air vent is closed until a predetermined temperature is reached.

3. An adjustable thermostatically controlled air bleed valve for a carbureter consisting of a vent, a closure for said vent mounted on the free end of an anchored bimetallic strip flexing at a definite temperature, a relatively rigid bar attached to said strip near the point of anchorage, extending in line with the normal axis thereof, and apertured to circumscribe said vent and said closure, a portion of said bar projecting beyond said vent and said closure, a screw threadingly engaged in a suitable bar to retain said projecting bar and said bimetallic strip and said closure at any desired position relative to said vent at predetermined temperature, and yielding means for maintaining said screw in said position.

4. A presetting attachment for a thermostatically controlled air bleed valve in a carbureter, consisting of an adjusting bar attached to the thermostatic element adjacent its anchorage, an apertured portion of said adjusting bar loosely engaging the air bleed valve, an extended portion of said bar projecting beyond said valve, and means engaging the projecting end of said bar to vary the initial flexure of the thermostatic element relative to its anchorage.

5. An adjusting fixture for a thermostatic element controlling the air bleed valve of a carbureter consisting of a bar attached to the thermostatic element adjacent its anchored end and extending in line with the normal axis of the thermostatic element beyond the free end of said element and means engaging the extended free end of said bar to vary the initial flexure of the thermostatic element relative to its anchorage.

DETROIT AND
SECURITY TRUST CO.,
*Executor of the Estate of Chester F. Johnson, Deceased.*
By CHARLES E. HOWARD.
*Trust Officer.*